Figure 6:
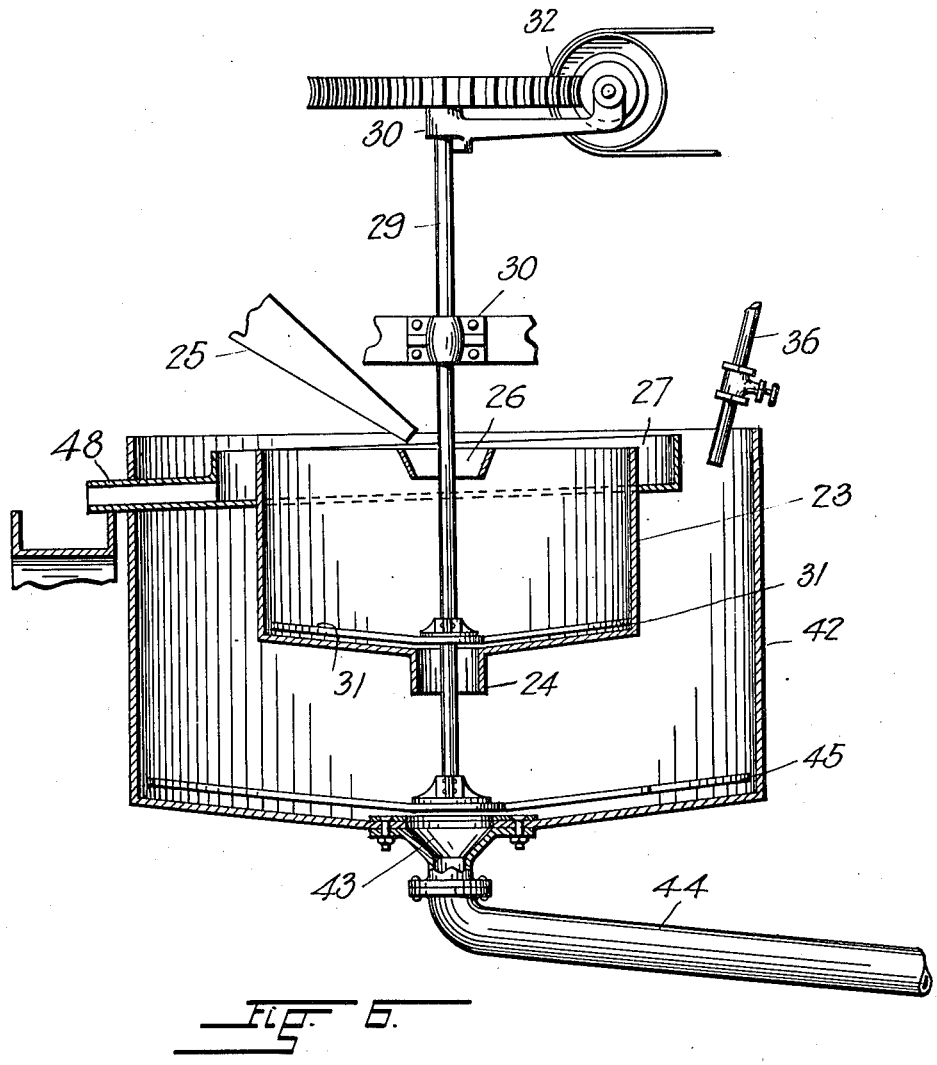

A. L. BLOMFIELD.
CLASSIFIER.
APPLICATION FILED MAY 22, 1916.
1,292,237.
Patented Jan. 21, 1919.
3 SHEETS—SHEET 1.
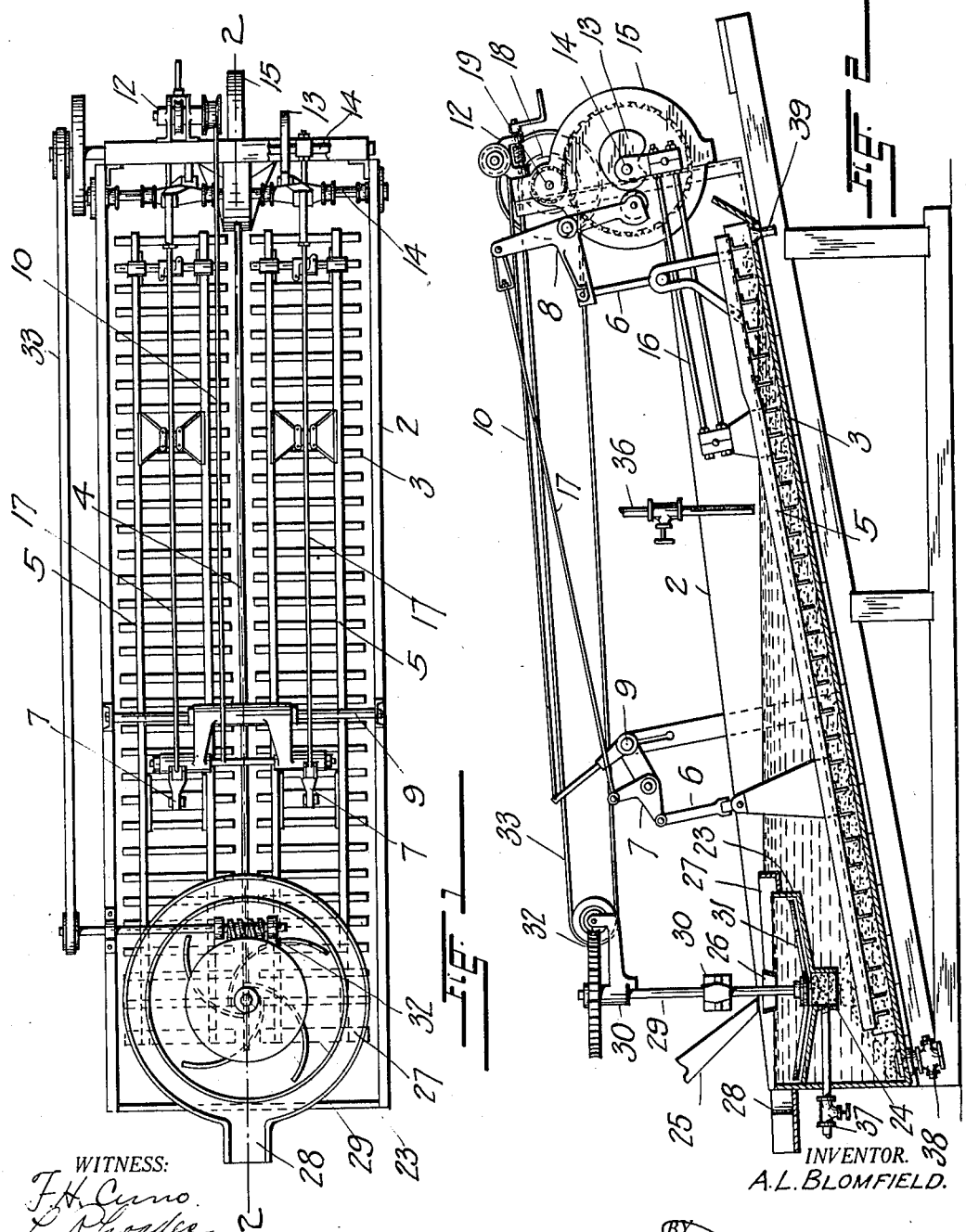
WITNESS:
INVENTOR.
A.L. BLOMFIELD.
BY
ATTORNEY.

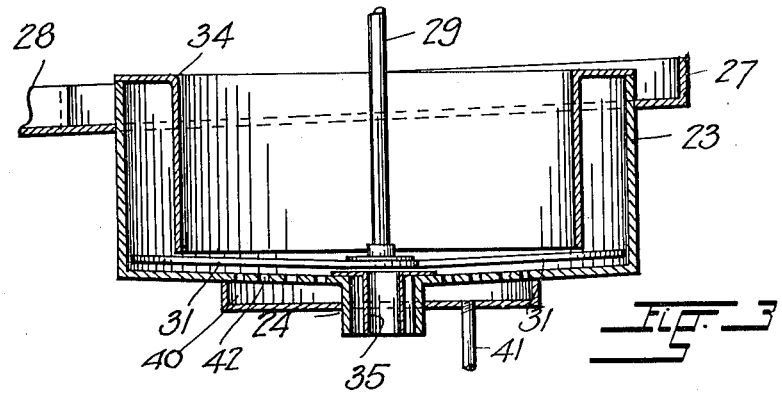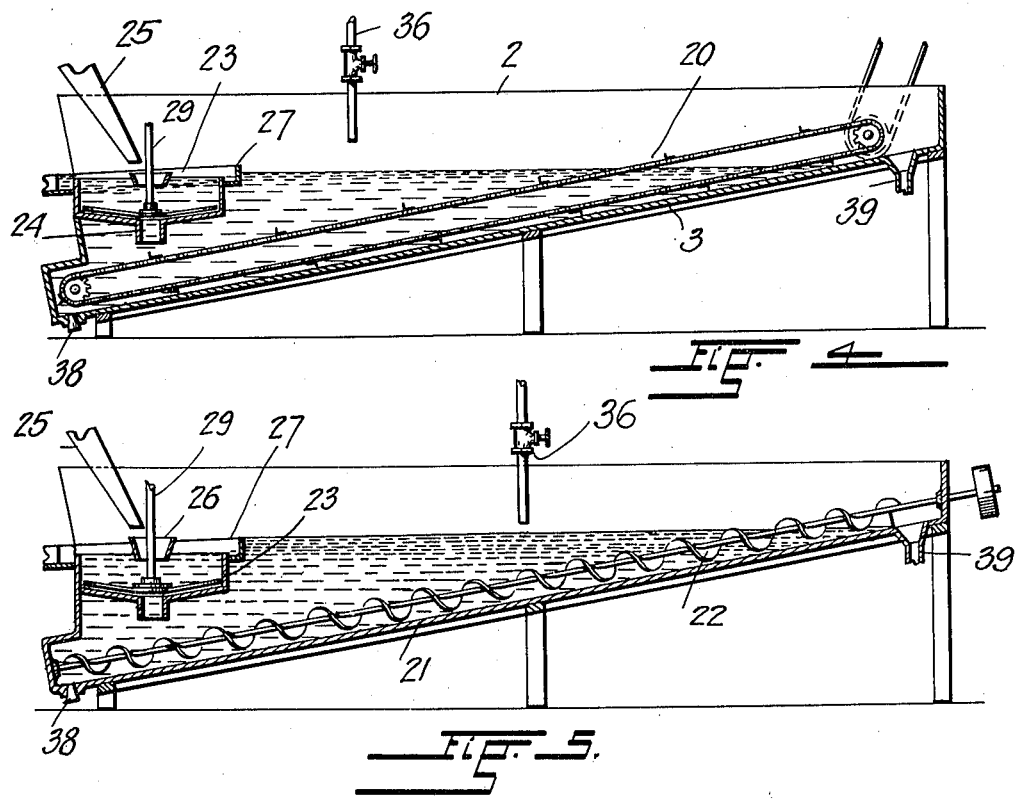

A. L. BLOMFIELD.
CLASSIFIER.
APPLICATION FILED MAY 22, 1916.

1,292,237.

Patented Jan. 21, 1919.
3 SHEETS—SHEET 3.

WITNESS:

INVENTOR.
A. L. BLOMFIELD.

BY
ATTORNEY.

UNITED STATES PATENT OFFICE.

ALFRED L. BLOMFIELD, OF DENVER, COLORADO, ASSIGNOR TO THE DORR COMPANY, A CORPORATION OF DELAWARE.

CLASSIFIER.

1,292,237.  Specification of Letters Patent.  Patented Jan. 21, 1919.

Application filed May 22, 1916. Serial No. 99,111.

*To all whom it may concern:*

Be it known that I, ALFRED L. BLOMFIELD, a subject of George V, King of England, residing at Denver, in the county of Denver and State of Colorado, have invented certain new and useful Improvements in Classifiers, of which the following is a specification.

My invention relates to settling apparatus and more particularly to classifiers of the type in which fine and coarse solids contained in ore-pulp or other liquid suspensions are by gravity, divided in a settling or subsidence vessel and separately discharged therefrom.

It is the principal object of the present invention to provide in apparatus of the character described, a chamber providing an initial settling zone and having an overflow for liquid and suspensions and in communication with said chamber a vessel providing a secondary settling zone and dewatering chamber in which the oversize or coarse product is mechanically impelled to a point of discharge above the liquid level determined by the overflow.

In the preferred form of my invention the primary settling zone is provided by a shallow tank and the dewatering chamber including the secondary settling zone comprises an elongated trough-shaped box provided with an inclined bottom, and a rake or conveyer of suitable construction is mounted therein to impel settling matter along said bottom toward an outlet above the liquid level.

Mechanical means effect a continuous uniform movement of the coarse matter from the initial settling zone into the secondary zone, and adjustable devices are provided for regulating the capacity of the shallow tank and the area of its outlet to compensate for variations in the feed or to vary the coarseness of the overflow.

Fine particles entering the dewatering trough with the coarse product are separated therefrom by the agitative action of the rake or conveyer and compelled to reënter the primary settling chamber by a countercurrent produced by introducing a flow of liquid into the moving mass exteriorly of said chamber. The material is thus repeatedly subjected to the separative actions in the settling zones until a clean and distinct separation of the sizes is obtained and the coarse product is discharged from the machine with a limited percentage of moisture and is thereby adapted for immediate treatment in the mill or other appliance to which it is conveyed.

In the accompanying drawings in the various views of which like parts are similarly designated, Figure 1 represents a plan view of my improved classifier in its preferred form, Fig. 2, a longitudinal section of the same, taken along the line 2—2, Fig. 1, Fig. 3, a vertical central section of the initial settling chamber showing a suitable means of varying the capacity of the chamber and the area of its outlet, Figs. 4 and 5, sectional views similar to that of Fig. 2, showing modified constructions of the mechanism for impelling the coarse product along the inclined bottom of the dewatering trough, and Fig. 6, a sectional elevation of a modified form of the invention.

Referring first to Figs. 1 and 2 of the drawings, the reference numeral 2 designates an elongated trough-shaped settling box provided with a longitudinally sloping bottom 3.

In the construction shown in the drawings, the trough is divided by a low central partition 4 into two longitudinal compartments in which a pair of coöperatively associated conveying elements act alternately to move the settling solids upwardly along the inclined bottom toward an outlet adjacent the upper end thereof.

The conveyer elements in the preferred form of my invention, illustrated in Figs. 1 and 2, consist of a pair of reciprocating rakes 5 which are suspended in substantially parallel relation to the bottom of the trough. Each rake is suspended by means of hangers 6 from bell-cranks 7 and 8 which are mounted for oscillation above the settling-trough.

One of the bell cranks, 7, is mounted on a lever-arm of a rocker shaft 9 which by means of a cable 10 is connected with a winding mechanism 12 by the use of which the position of the rake with relation to the bottom of the dewatering trough may be determined within determinate limits.

The other bell-crank 8 which is mounted adjacent the forward, upper end of the trough is periodically actuated by a cam 13 on a rotary shaft 14 which through the intermediary of a crank wheel 15 and a pitman 16 imparts a reciprocating movement to the rake.

The two bell-cranks are connected for conjunctive movement by means of a rod 17, and the shaft 14 is through the instrumentality of a gearing 18 connected with a powershaft 19 which receives its motion from a conveniently located motor.

The actuation of the bell cranks at the forward end of the trough takes place when the respective rakes approach the end of their downward stroke and it effects an upward movement of the rakes which compels them to move during the return stroke over and above the material deposited on the bottom of the trough.

The cams and crank-wheels operating the two rakes are relatively positioned on the shaft 14 so that the two rakes move in opposite directions in the compartments of the trough.

The above described conveying mechanism is similar to that disclosed in United States Patent No. 1,156,543, David J. Nevill, issued October 12, 1915, and is, *per se*, not part of the present invention.

In the form of the classifier shown in Fig. 4 an endless belt conveyer 20 takes the place of the rakes of the first-described construction, and in the modification illustrated in Fig. 5, the dewatering chamber consists of an inclined tubular conduit 21 in which a screw-conveyer 22 has a rotary movement.

Disposed at the lower end of the trough 3 at a distance above its sloping bottom is a vessel 23 which provides the hereinbefore referred to initial settling chamber.

The material to be classified is fed into this chamber and separates by gravitation into two sizes, one of which consists of suspensions in liquid which overflow at the upper end of the chamber, and the other one of which is composed of settling solids which are discharged into the trough 2.

The vessel is preferably made in the form of a shallow cylindrical tank having a slightly sloping bottom and an outlet 24 for settling matter.

The material is fed through a launder 25 into a feed box 26 and the liquid and suspensions overflowing the peripheral edge of the vessel are received in a launder 27 provided with a discharge spout 28.

A shaft 29 rotatably suspended in bearings 30 carries at its lower end a number of sweeps 31 which move in close proximity to the bottom of the vessel and are designed to move material settling upon said bottom toward the outlet 24.

The shaft is slowly rotated by means of a worm movement 32 which in the construction illustrated in Fig. 2 may be driven from the power shaft of the rake-operating mechanism, through the medium of a belt 33.

The capacity of the vessel may be varied by the use of flanged rings 34 which are supported upon its peripheral edge as shown in Fig. 3, and the area of the outlet 24 may be reduced by similarly shaped rings 35 of smaller dimension as illustrated in the same figure.

While the use of a settling chamber of the form hereinbefore described, is preferable, I desire it understood that a vessel of different construction may, under certain conditions, be found suitable for the purposes of my invention. The tank 23 may, for example, be provided with a downwardly sloping bottom which either coöperates with a discharging mechanism or simply effects the continuous uniform movement of the settling solids toward the outlet of the chamber.

A valve-controlled conduit 36 connected with a conveniently located source of water-supply, serves to introduce a flow of liquid into the dewatering trough for the purpose of producing a current moving in a direction opposite to that in which coarse product is impelled along the sloping bottom of the trough, or a similar result may be obtained by admitting a current of liquid into the outlet 24 of the initial settling zone through a valve-closed conduit 37.

A normally closed outlet 38 at the lower end of the trough is provided to drain the same whenever required.

In the operation of my improved classifier the material under treatment is fed into the settling chamber 23 through the centrally disposed feed box 26. The fine constituents of the material are held in suspension in the liquid and overflow the peripheral edge of the vessel into the launder 27 while the heavier and coarser solids fall toward the bottom of the vessel.

The settling matter is by the action of the rotating sweeps 31 moved across the bottom of the vessel toward and into the outlet which discharges into the dewatering trough.

The rakes moving along the bottom of the first trough move the coarse product of the first settling action upwardly toward the outlet 39 at the upper end of the same and by their reciprocating motion maintain the fine particles which were discharged from the primary settling zone with the coarser matter, in suspension in the liquid in the deepest portion of the trough which constitutes the secondary settling zone.

These suspensions naturally arrange themselves in this secondary zone in layers according to their different specific gravities and the liquid introduced into the dewatering trough through the conduit 36 produces a counter-current which opposes the forward movement of the fine particles with the coarse product and compels the suspensions in the secondary settling zone to reënter the primary settling zone in which they are again subjected to the classifying action, and permitted to overflow into the launder with the fines of the material constantly fed into the classifier from the feed-box 26.

The coarse product or oversize is delivered through the outlet of the trough above the water-level determined by the overflow of the vessel 23, free from fine material and with a comparatively small percentage of moisture.

The counter-current may be amplified by a flow of liquid entering the outlet 24 through the conduit 37, or if so desired an upward flow may be produced by water admitted through the conduit 37 exclusive of that which is introduced into the dewatering trough through the conduit 36.

The capacity of the apparatus is readily regulated to compensate for increasing or decreasing feed by placing one of the reduction rings 34 shown in Fig. 3, in the vessel, it being understood that rings of different dimensions may be provided to reduce the capacity of the vessel to any desired degree.

The area of the outlet 24 may likewise be reduced to any desired extent by the use of the reduction rings 35, and the velocity of the upward flow may thus be regulated in accordance with the volume of the supply or the nature of the material under treatment.

Instead of introducing the liquid which produces the countercurrent, into the dewatering chamber through the pipe 36 or into the outlet 24 through the pipe 37, the bottom of the vessel 23 may be perforated as shown at 42 in Fig. 3, and a chamber 40 formed below the perforated portions.

Liquid admitted to this chamber through a pipe 41 enters the settling zone in a number of separated jets.

In the construction shown in Fig. 6 the secondary settling zone and dewatering chamber consists of a cylindrical vessel 42 having in its bottom a discharge opening 43 which preferably is connected with a suction pump (not shown in the drawings) by means of a conduit 44. The volume of the discharge from the dewatering chamber is in this construction regulated by varying the stroke or velocity of the pump.

A series of sweeps 45 has a slow movement over the bottom of the chamber to impel the settling solids in a thickened condition toward the outlet.

The vessel 23 comprising the initial settling chamber is preferably placed coaxial with the vessel 42 which constitutes the secondary settling zone and the dewatering element, and the two series of sweeps 31 and 45 which move about the bottoms of the two vessels, may, if so desired, be mounted on one and the same shaft, as shown in the drawings.

A spout 48 connected with the overflow launder 27 of the vessel 23 extends beyond the wall of the dewatering chamber and the conduit 36 is positioned to admit a flow of liquid into the dewatering chamber to produce an upward current which opposes the downward movement of material from the initial settling zone.

In the operation of the construction shown in Fig. 6, the material fed into the vessel 23 is divided into the suspensions which with the liquid overflow into the launder 27, and the coarser matter which passes through the outlet 24 into the secondary settling zone of the vessel 42.

In the last-mentioned zone the coarse matter settles upon the bottom of the vessel and is in a thickened condition moved to and through the outlet 43 and into the conduit 44 with a very small percentage of moisture.

The fines which entered the secondary settling chamber with the coarse constituents of the material are held in suspension to reënter the vessel 23 by the counter-current produced by the liquid introduced into the vessel 42 through the pipe 36.

Modifications other than those shown in the drawings and hereinabove described, may be availed of within the spirit of my invention as set forth in the following claims:

1. A classifier comprising in combination, a secondary settling chamber and a primary settling chamber which has an overflow determining the water-levels in said chambers and having a portion projecting within the secondary chamber, the secondary chamber having an outlet above its liquid-level, and the primary chamber having a bottom surface adapted to cause the congregation of settling matter to a semi-solid condition, and in connection with said surface, means providing a passage discharging beneath the water-level of the secondary chamber, a device for moving material settling upon the bottom of the primary chamber toward said passage, means for feeding material into the primary chamber, and a device for moving material settling in the secondary chamber along a sloping surface to said outlet, said secondary chamber having a free settling region above said device.

2. A classifier comprising in combination, a secondary settling chamber and a primary settling chamber which has an overflow determining the water-levels in said chambers and having a portion projecting within the secondary chamber, the secondary chamber having an outlet above its liquid-level, and the primary chamber having a bottom surface adapted to cause the congregation of settling matter to a semi-solid condition, and in connection with said surface, means providing a passage discharging beneath the water-level of the secondary chamber, a device for moving material settling upon the bottom of the primary chamber toward said passage, means for feeding material into the primary chamber, and a device for moving material settling in the secondary chamber along a sloping surface to said outlet, said secondary chamber being adapted to maintain a liquid-level slightly above that in the primary settling chamber and having a free settling region above said device.

3. A classifier comprising in combination, a secondary settling chamber and a primary settling chamber which has an overflow determining the water-levels in said chambers, and having a portion projecting within the secondary chamber, the secondary chamber having an outlet above its liquid-level, and the primary chamber having a bottom-surface adapted to cause the congregation of settling matter to a semi-solid condition, and in connection with said surface, means providing a passage discharging beneath the water-level of the secondary chamber, a device for moving material settling upon the bottom of the primary chamber toward said passage, means for feeding material into the primary chamber, means for the supply of a liquid to the secondary chamber, and a device for moving material settling in the secondary chamber along a sloping surface to said outlet, said secondary chamber having a free settling region above said device.

4. A classifier comprising in combination, a secondary settling chamber having a sloping bottom surface adapted to support the settling constituents of ore-pulp against a downward flow, and a primary settling chamber which has an overflow determining the water-levels in said chambers, and having a portion projecting within the secondary chamber, the secondary chamber having an outlet above its liquid-level, and the primary chamber having a bottom surface adapted to cause the congregation of settling matter to a semi-solid condition, and in connection with said surface, means providing a passage discharging beneath the water level of the secondary chamber, a device for moving material settling upon the bottom of the primary chamber toward said passage, means for feeding material into the primary chamber, and a device for moving material settling in the secondary chamber along said sloping surface to effect its discharge through outlet, said secondary chamber having a free settling region above said device.

5. A classifier comprising in combination, a secondary settling chamber having a sloping bottom surface and a primary settling chamber which has an overflow determining the water-levels in said chambers, and having a portion projecting within the secondary chamber, the secondary chamber having an outlet above its liquid-level, and the primary chamber having a bottom surface adapted to cause the congregation of settling matter to a semi-solid condition, and in connection with said surface, means providing a passage discharging beneath the water-level of the secondary chamber, a device for moving material settling upon the bottom of the primary chamber toward said passage, means for feeding material into the primary chamber, and a device for moving material settling in the secondary chamber along said sloping surface to effect its discharge through said outlet, said secondary chamber having a free settling region above said device.

6. A classifier comprising an oblong secondary settling chamber, and a primary settling chamber which has an overflow determining the water levels in said chambers, and having a portion projecting within the secondary chamber, the secondary chamber having at one of its ends an outlet above its liquid level, and the primary chamber having a bottom surface adapted to cause the congregation of settling matter to a semi-solid condition, and in connection with said surface, means providing a passage discharging beneath the water-level of the secondary chamber at the opposite end thereof, a device for moving material settling upon the bottom of the primary chamber toward said passage, means for feeding material into the primary chamber and a device for moving material settling in the secondary chamber along a sloping surface to said outlet, said secondary chamber having a free settling region above said device.

7. A classifier comprising an oblong secondary settling chamber having a longitudinally sloping bottom surface, and a primary settling chamber which has an overflow determining the water-levels in said chambers, and having a portion projecting within the secondary chamber, the secondary chamber having at one of its ends an outlet above its liquid level, and the primary chamber having a bottom surface adapted to cause the congregation of settling matter to a semi-solid condition and in connection with said surface, means providing a passage discharging beneath the water level of the secondary chamber at the opposite end thereof, a device for moving material settling upon the bottom of the primary chamber toward said passage, means for feeding material into the primary chamber, and a device for moving material settling in the secondary chamber along said sloping surface to effect its discharge through said outlet, said secondary chamber having a free settling region above said device.

8. A classifier comprising in combination, a secondary settling chamber and a primary settling chamber which has an overflow determining the water-levels in said chambers, and having a portion projecting within the secondary chamber, the secondary chamber having an outlet above its liquid-level, and the primary chamber having in its bottom surface a passage discharging beneath the water-level of the secondary chamber, means for feeding material into the primary chamber, and a device for moving material settling in the secondary chamber along a sloping surface to said outlet, said secondary chamber having a free settling region above said device.

In testimony whereof I have affixed my signature in presence of two witnesses.

ALFRED L. BLOMFIELD.

Witnesses:
G. J. ROLLANDET,
L. RHOADES.